United States Patent
Park

(10) Patent No.: US 11,420,500 B2
(45) Date of Patent: Aug. 23, 2022

(54) VARIABLE AIR VENT

(71) Applicants: Hyundai Motor Company, Seoul (KR); Kia Motors Corporation, Seoul (KR)

(72) Inventor: Sun-Yong Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 854 days.

(21) Appl. No.: 16/161,800

(22) Filed: Oct. 16, 2018

(65) Prior Publication Data

US 2019/0118622 A1 Apr. 25, 2019

(30) Foreign Application Priority Data

Oct. 25, 2017 (KR) .................. 10-2017-0139154

(51) Int. Cl.
*B60H 1/34* (2006.01)
*F24F 13/14* (2006.01)
*F16H 1/22* (2006.01)

(52) U.S. Cl.
CPC ........... *B60H 1/3428* (2013.01); *B60H 1/345* (2013.01); *F16H 1/222* (2013.01); *F24F 13/142* (2013.01); *B60H 2001/3464* (2013.01); *B60H 2001/3471* (2013.01)

(58) Field of Classification Search
CPC .... B60H 1/3428; B60H 1/3442; B60H 1/345; B60H 2001/3464; B60H 2001/3471; F24F 13/142; F24F 13/14; F16H 1/222
USPC ................................. 454/154, 155
See application file for complete search history.

(56) References Cited

U.S. PATENT DOCUMENTS

| 2016/0102884 A1* | 4/2016 | Terai | F24F 13/065 |
| | | | 454/335 |
| 2016/0361979 A1 | 12/2016 | Brinas | |
| 2017/0057328 A1* | 3/2017 | Sano | B60H 1/3442 |

FOREIGN PATENT DOCUMENTS

| CN | 106394170 A | 2/2017 |
| DE | 29914962 U1 | 10/1999 |
| DE | 102013001129 A1 | 7/2014 |
| JP | 2011-229268 A | 11/2011 |
| JP | 2014034280 A | 2/2014 |
| JP | 2014-091377 A | 5/2014 |

(Continued)

OTHER PUBLICATIONS

Hibino, Yoshimitsu, JP2014088115 Translation.pdf, "Register", May 2015, pp. 1-11.*

*Primary Examiner* — Avinash A Savani
*Assistant Examiner* — Ryan L Faulkner
(74) *Attorney, Agent, or Firm* — Fox Rothschild LLP

(57) ABSTRACT

A variable air vent is provided. The air vent includes a housing that is mounted on a vehicle and has an open center. A ball housing is coupled to the housing and has an inner side surface that is formed in a curved surface. A ball configured has front and rear surfaces opened and a side surface that is inserted into the ball housing in a curved surface form corresponding to the ball housing. A first knob and a second knob are vertically disposed on the front and rear surfaces of the ball and a plurality of discharge range adjusting wings have a first rotating shaft that is integrally formed at one end of a flat plate. A first side of the first rotating shaft is inserted into the ball and a second side thereof includes a first wing gear inserted into the second knob.

6 Claims, 11 Drawing Sheets

(56) References Cited

FOREIGN PATENT DOCUMENTS

| | | | |
|---|---|---|---|
| JP | 2014088115 A * | 5/2014 | |
| JP | 2017-043172 A | 3/2017 | |
| KR | 10-0794010 B1 | 1/2008 | |
| KR | 10-1535039 B1 | 7/2015 | |
| KR | 101535039 B1 * | 7/2015 | ........... B60H 1/3428 |
| KR | 10-1647560 B1 | 8/2016 | |
| WO | 2014024788 A1 | 2/2014 | |

* cited by examiner

VARIABLE AIR VENT

CROSS-REFERENCE(S) TO RELATED APPLICATIONS

This application claims priority to Korean Patent Application No. 10-2017-0139154, filed on Oct. 25, 2017, which is incorporated herein by reference in its (their) entirety.

BACKGROUND

Field of the Disclosure

The present disclosure relates to an air vent, and more particularly, to an air vent used for discharging wind of an air conditioner or a heater.

Description of Related Art

An air conditioning system is typically used in maintaining a desired temperature within a vehicle. However, preferences between drivers varies. For example, some drivers prefer to maximally discharge a wind of an air conditioner or a heater toward the body and some drivers prefer to minimally discharge a wind of an air conditioner or a heater toward the body.

A heater is typically consistently operated in winter or colder weather months, but many drivers are reluctant to directly discharge hot air to the face or body, which is true for the air conditioner in summer. Currently, an air vent used in a vehicle controls a wind direction and a wind volume, but is unable to control a discharge range of wind. Therefore, wind is intensively discharged only to a local area in the set direction.

The above information disclosed in this background section is merely for enhancement of understanding of the background of the disclosure and therefore it may contain information that does not form the prior art that is already known in this field to a person of ordinary skill in the art.

SUMMARY

An exemplary embodiment of the present disclosure provides a variable air vent capable of dividing and discharging a wind of an air conditioner or heater in a concentration mode or a dispersed mode. Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, a variable air vent may include: a housing mounted on a vehicle and having an open center; a ball housing coupled to the housing and having an inner side surface formed in a curved surface; a ball having open front and rear surfaces and a side surface inserted into the ball housing in a curved surface form corresponding to the ball housing; a first knob and a second knob vertically disposed on the front and rear surfaces of the ball; and a plurality of discharge range adjusting wings having a first rotating shaft integrally formed at one end of a flat plate, with a first side of the first rotating shaft being rotatably inserted into the ball and a second side thereof having a first wing gear inserted into the second knob, wherein the first knob may include a first bevel gear inserted into the second knob, and the first bevel gear may be geared with the first wing gear of the plurality of discharge range adjusting wing.

When the first knob rotates about an open front and rear direction of the ball, an angle formed by the flat plate and the open front surface of the ball varies as the discharge range adjusting wing rotates. A rotation guide may protrude on a first side of the discharge range adjusting wing, and the rotation guide may be inserted into a guide groove formed in the ball. The guide groove may have a circular arc shape in cross section.

The second knob may be rotatably coupled to the first knob through a first knob insertion groove formed in front of a cylindrical body and a rear of the body may include a second bevel gear. The variable air vent may further include a pair of discharge amount adjusting wings provided to cover the open rear surface of the ball. One end of each of the pair of discharge amount adjusting wings may include a second wing gear and the second wing gear may be geared with the second bevel gear.

One end of any one of the discharge amount adjusting wings may include a male engaging portion and one end of the other of the discharge amount adjusting wings may include a female engaging portion and the male engaging portion and the female engaging portion may be coupled to each other to share one rotary shaft. The second wing gear may be formed in each of the male engaging portion and the female engaging portion. A plurality of shaft insertion grooves may be formed in the side surface of the body of the second knob by setting a rotation direction of the second knob as a longitudinal direction and the first rotary shaft of each of the discharge range adjusting wings may penetrate through each of the corresponding shaft insertion grooves.

In accordance with another exemplary embodiment of the present disclosure, a variable air vent may include: a housing mounted on a vehicle and having an open center; a ball housing coupled to the housing and having an inner side surface formed in a curved surface; a ball having front and rear surfaces opened and a side surface inserted into the ball housing in a curved surface form corresponding to the ball housing; a first knob and a second knob vertically disposed on the front and rear surfaces of the ball; and a plurality of discharge range adjusting wings having a first rotating shaft integrally formed at one end of a flat plate, with a first side of the first rotating shaft being rotatably inserted into the ball and a second side thereof having a first wing gear inserted into the second knob. The first knob may include a first bevel gear inserted into the second knob, and the first bevel gear may be geared with the first wing gear of the plurality of discharge range adjusting wing.

The variable air vent may further include: a pair of discharge amount adjusting wings provided to cover the open rear surface of the ball. The first knob may include a head, a first bevel gear and a rod having a first end connected to the head and a second end connected to the first bevel gear. One end of each of the pair of discharge amount adjusting wings may include a second wing gear and the second wing gear may be geared with the first bevel gear.

A rotation guide may protrude on one side of the discharge range adjusting wing, and the rotation guide may be inserted into a guide groove formed in the ball. The guide groove may have a circular arc shape in cross section. A plurality of shaft insertion grooves may be formed in the side surface of the body of the second knob by setting a rotation direction of the second knob as a longitudinal direction and the first rotary shaft of each of the discharge range adjusting wings may penetrate through each of the corresponding shaft insertion grooves.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In order to sufficiently understand the present disclosure, operational advantages of the present disclosure, and objects accomplished by exemplary embodiments of the present disclosure, the accompanying drawings showing exemplary embodiments of the present disclosure and contents described in the accompanying drawings should be referred. In describing preferred embodiments of the present disclosure, the known techniques or the repetitive description that may unnecessarily obscure the gist of the present disclosure will be omitted.

Figure 1:
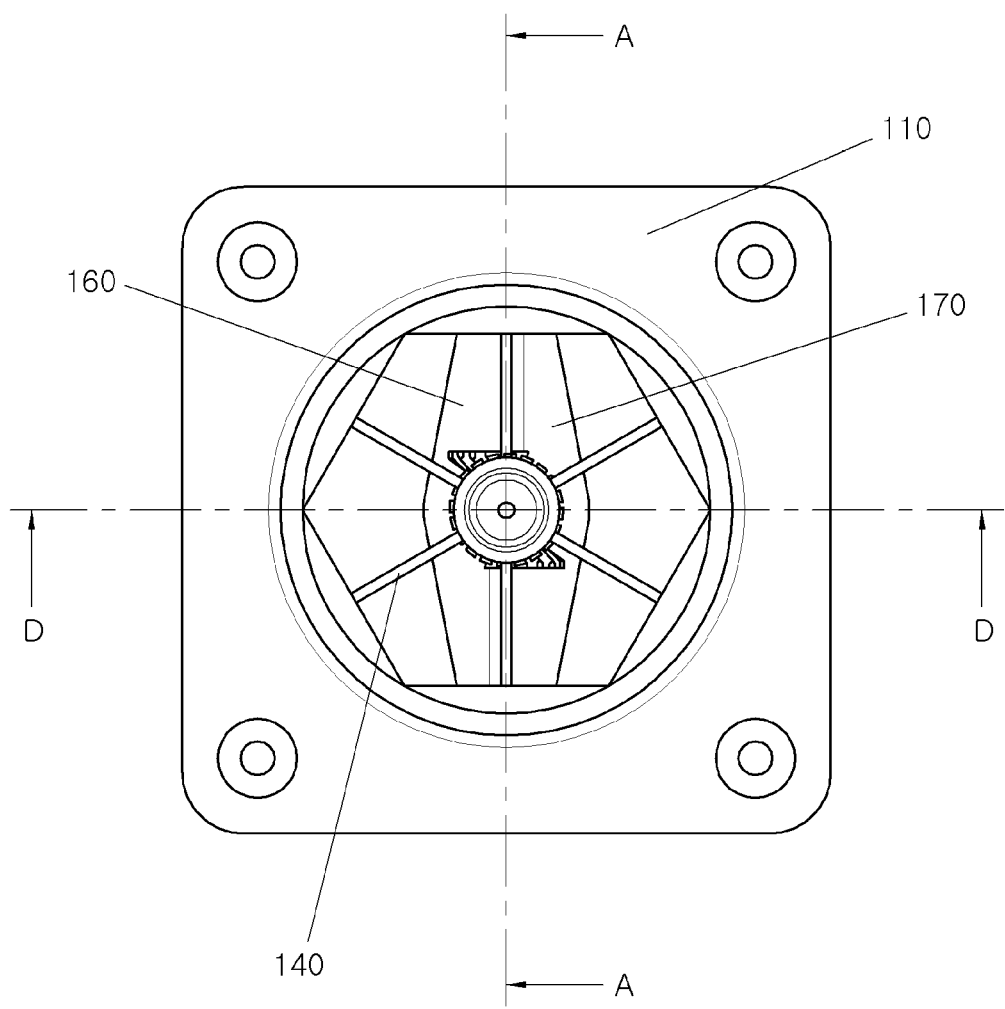
FIG. 1 is a front view of a variable air vent according to an exemplary embodiment of the present disclosure.
Figure 2:
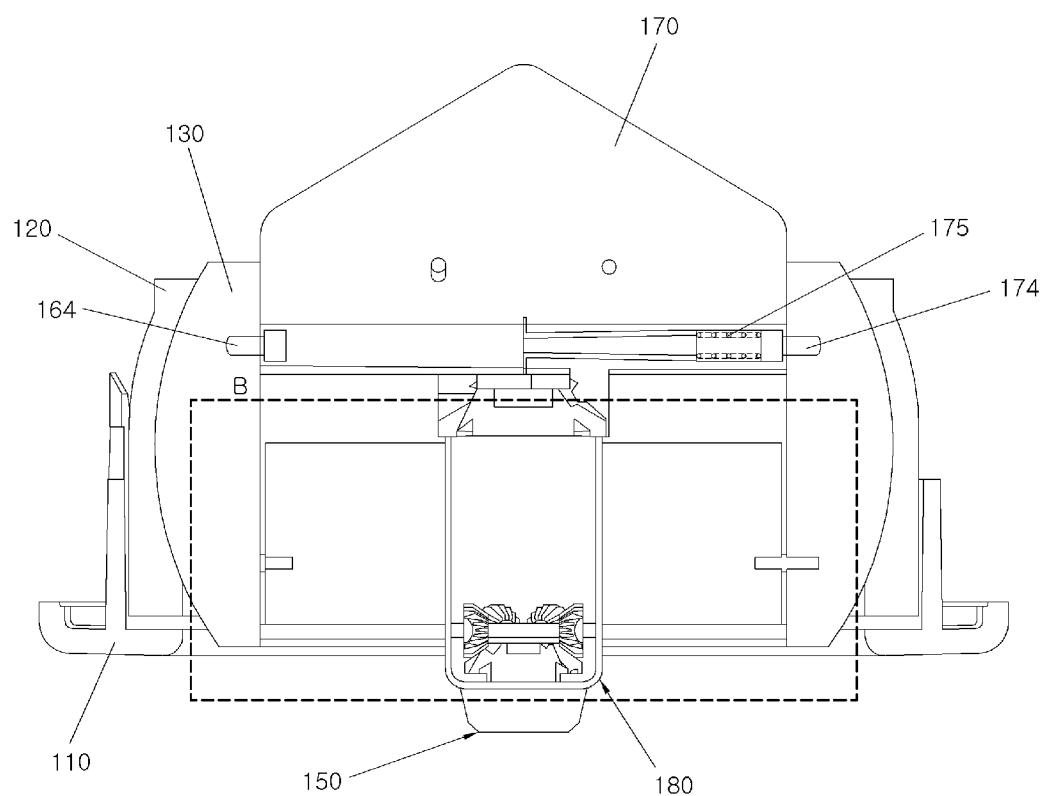
FIG. 2 is a cross-sectional view taken along line A-A' of FIG. 1 according to an exemplary embodiment of the present disclosure.
Figure 3:
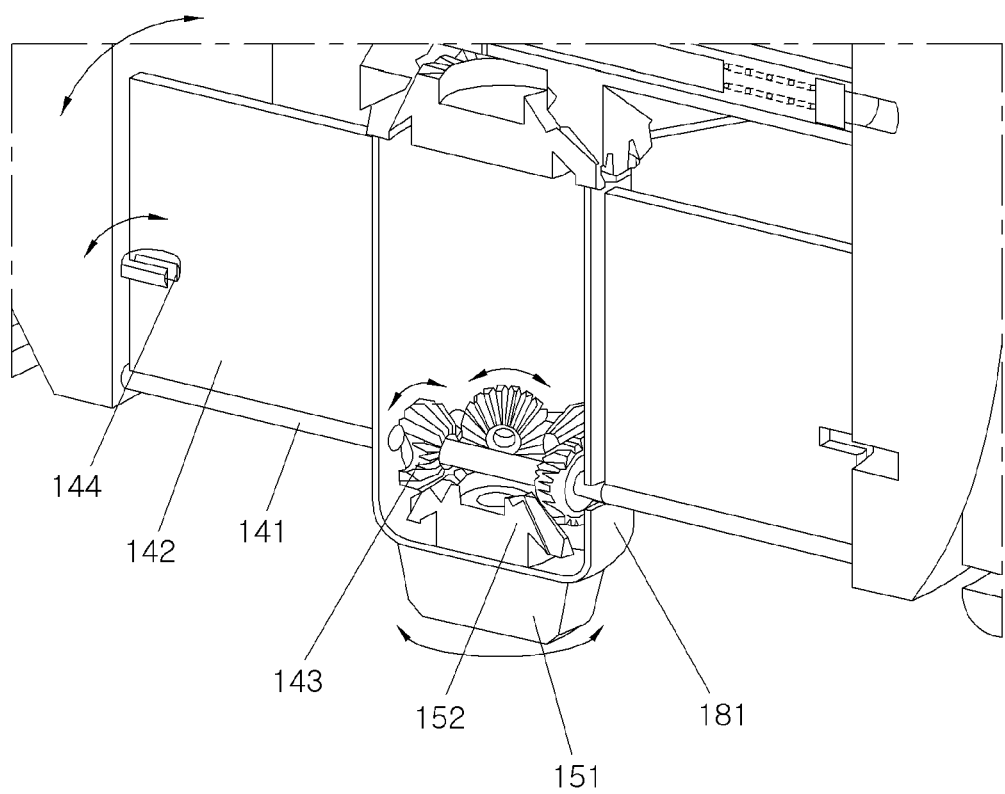
FIGS. 3 and 4 are diagrams showing in more detail portion B of FIG. 2 according to an exemplary embodiment of the present disclosure.
Figure 4:
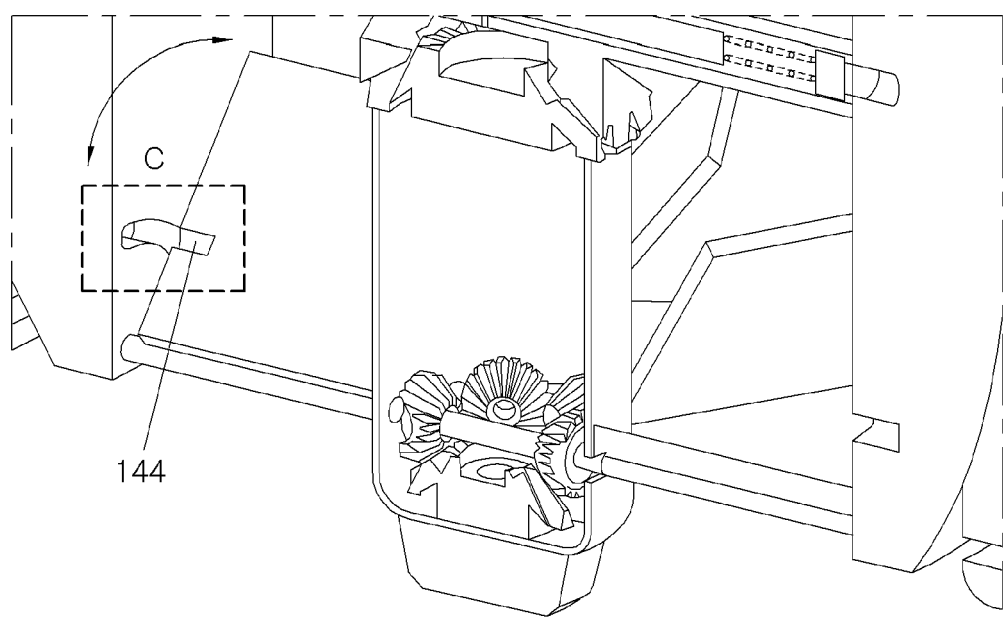
Figure 5:
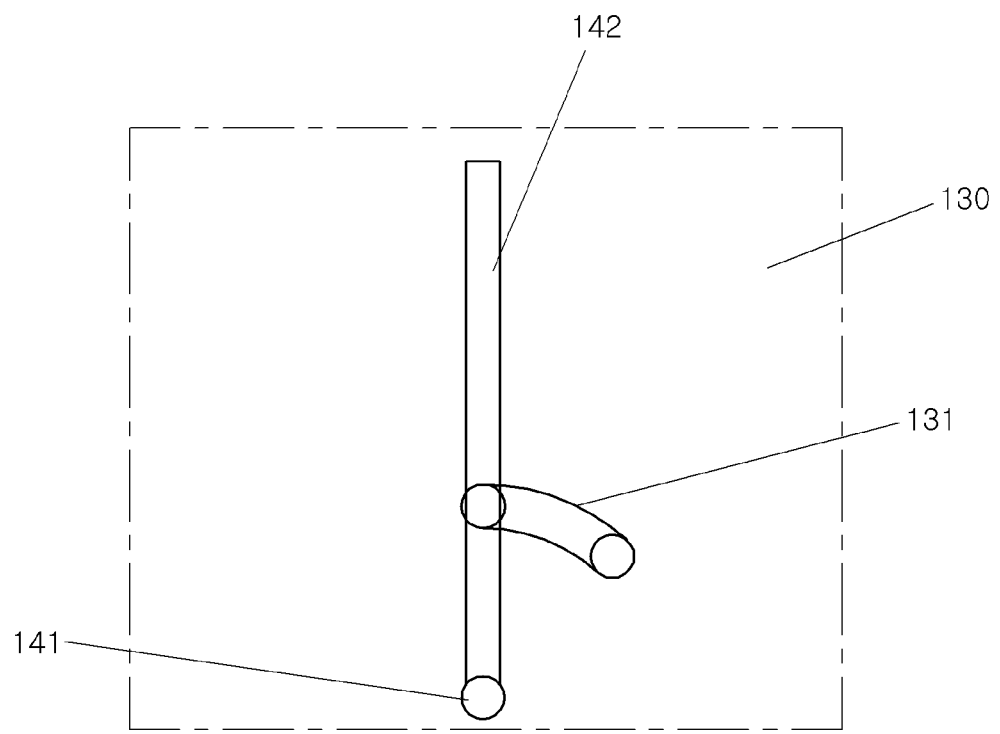
FIG. 5 is a cross-sectional view of one side of portion C in FIG. 4 according to an exemplary embodiment of the present disclosure.

FIG. 1 is a front view of a variable air vent according to an exemplary embodiment of the present disclosure, FIG. 2 is a cross-sectional view taken along line A-A' of FIG. 1, FIGS. 3 and 4 are diagrams showing in more detail portion B of FIG. 2, and FIG. 5 is a cross-sectional view of one side of portion C in FIG. 4. Hereinafter, a variable air vent according to exemplary embodiments of the present disclosure will be described with reference to FIGS. 1 to 5.

The variable air vent according to an exemplary embodiment of the present disclosure may include a housing 110 mounted on a dashboard or the like of a vehicle interior and may be configured to discharge wind generated by an operation of an air conditioner or a heater to the interior of the vehicle. The housing 110 may have a shape in which a mounting surface is substantially flat and a center thereof is open. A ball housing 120 may be coupled to an inside of the housing 110 and a ball 130 may be formed inside the ball housing 120.

The ball 130 may be formed in a rounded shape and an inner side surface of the ball housing 120 may be formed in a shape that corresponds to the appearance of the ball 130, and thus, the ball 130 may be rotatable about an arbitrary axis penetrating through the center of the ball housing 120 within the fixed ball housing 120. The front and rear surfaces may be formed in an opened shape to correspond to the opened aperture of the housing 110, and the open surface may have a circular shape on the front face or a hexagonal shape as shown.

The following configurations may be directly or indirectly coupled to the ball 130. The variable air vent according to the exemplary embodiment of the present disclosure may include a discharge range adjusting wing 140, a first knob 150, discharge amount adjusting wings 160 and 170, and a second knob 180. The first knob 150 and the second knob 180 may be in a vertical axis direction with respect to the front surface of the housing 110, and thus may operate as a type of handle capable of being rotatably driven or maneuvered by a driver.

In addition, the first knob 150 may adjust the discharge range adjusting wing 140 to be described later and the second knob 180 may adjust the discharge amount adjusting wings 160 and 170 to be described later. In particular, the first knob 150 may be integrally formed with a head 151 protruding further forward than the housing 110 to be adjusted or manipulated by a driver and a first bevel gear 152 at the rear of the first knob 150. The first bevel gear 152 may be inserted into the second knob 180, to allow the first knob 150 to rotate with respect to the second knob 180.

Further, the second knob 180 may include a hollow cylindrical body 181. A first side of the body 181 into which the first knob 150 is inserted may include a first knob insertion aperture and a second side of the body 181 may be integrally formed with the second bevel gear 182. The discharge range adjusting wing 140 may include a plurality of flat plates 142 perpendicular to the front surface of the housing 110, and one end (front end in the figure) of the respective flat pates 142 may include first rotary shafts, respectively.

A first side of the first rotary shaft 141 may be inserted into a groove formed in the ball 130 and thus the first rotary shaft 141 may be rotatable with respect thereto. A second side of the first rotary shaft 141 may be inserted into the body 181 of the second knob 180 and may be coupled to the first wing gear 143. As shown, the first wing gears 143 formed on the rotary shafts 141 of each of the six discharge range adjusting wings 140 may be geared with the first bevel gears 152 of the first knob 150 inside the second knob 180, and thus, the discharge range adjusting wing 140 may rotate with respect to the first rotary shaft 141 during the rotation of the first knob 150.

In addition, referring to FIG. 5, a rotation guide 144 may be formed laterally on one side of the flat plate 142, and the corresponding guide groove 131 may be formed on the ball 130 as well. As the discharge range adjusting wing 140 rotates about the first rotary shaft 141, the flat plate 142 rotates in the trajectory as shown in FIG. 4. For this operation, the guide groove 131 may have a circular arc shape in cross section and an angle range of the discharge range adjusting wing 140 may be set by a length of the guide groove 131.

Figure 6A:
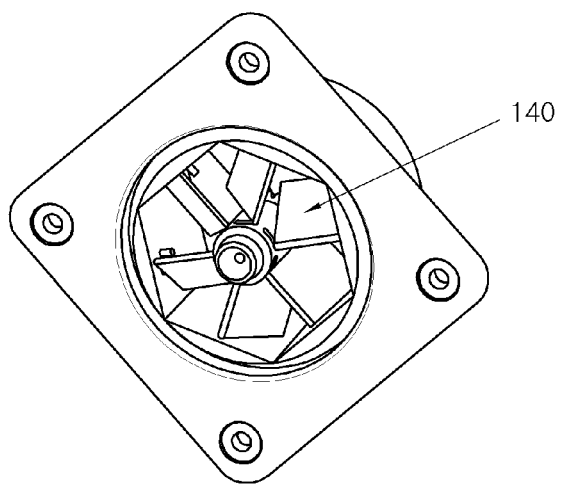
FIGS. 6A-6B are diagrams showing a wind direction in a dispersion mode by a variable air vent according to the exemplary embodiment of the present disclosure.
Figure 6B:
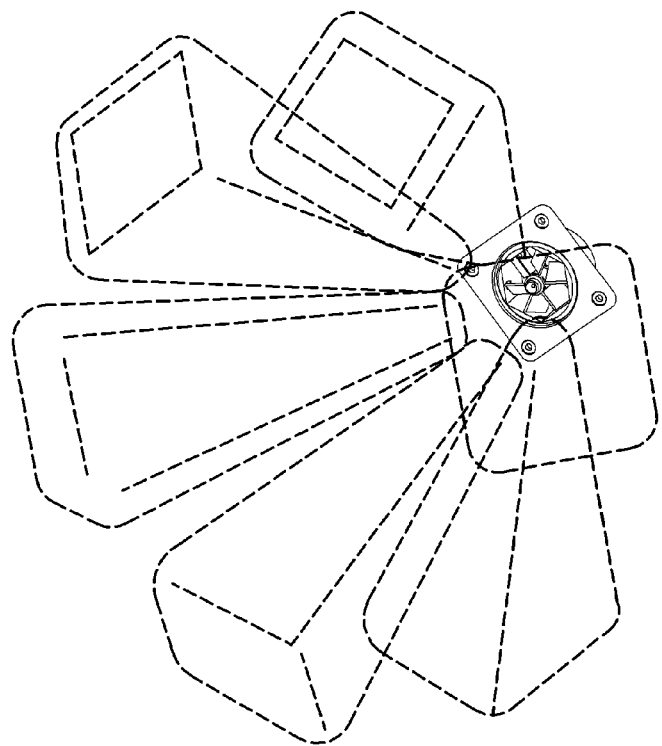
Figure 7:
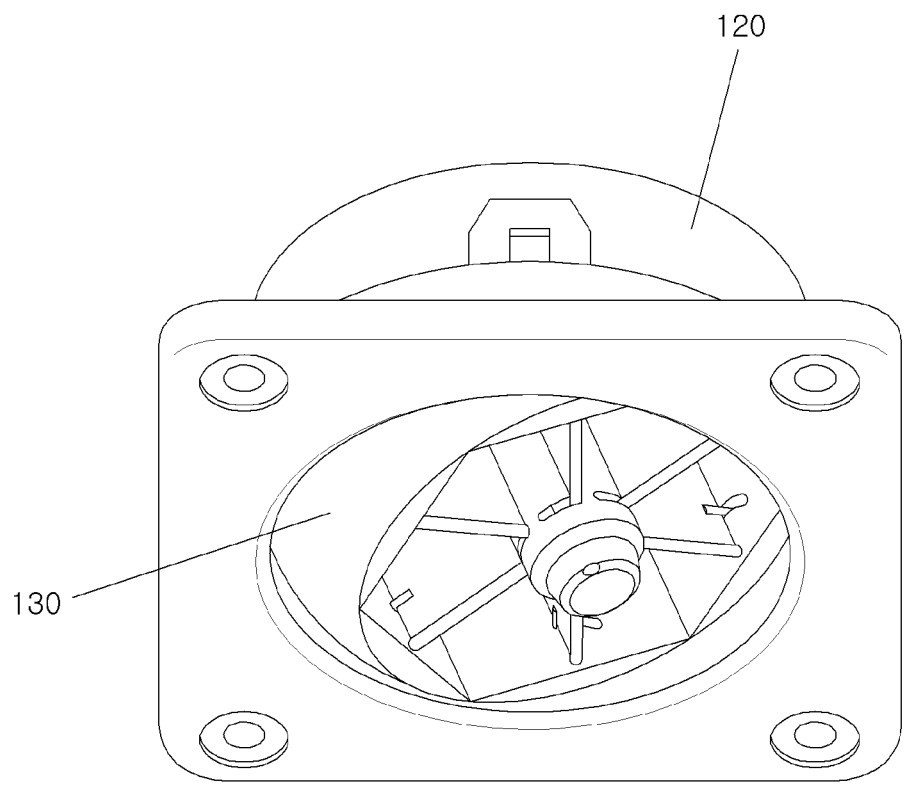
FIG. 7 is a diagram showing an operation of the variable air vent according to the exemplary embodiment of the present disclosure.

According to the present disclosure, the discharge range of air through the air vent may be selected in the concentration mode or the dispersion mode by the discharge range adjusting wing 140 and the first knob 150. In other words, the discharge range adjusting wing 140 may be configured to directly inject air in the concentration mode in a state as shown in FIG. 3, and indirectly inject in the dispersion mode as shown in FIGS. 6A-6B in a state as shown in FIG. 4, to adjust the air to a soft spray in a wider range as opposed to a more direct narrower range. In addition, the setting of the main direction may be changed by the rotation of the ball 130 as shown in FIG. 7.

Figure 8:
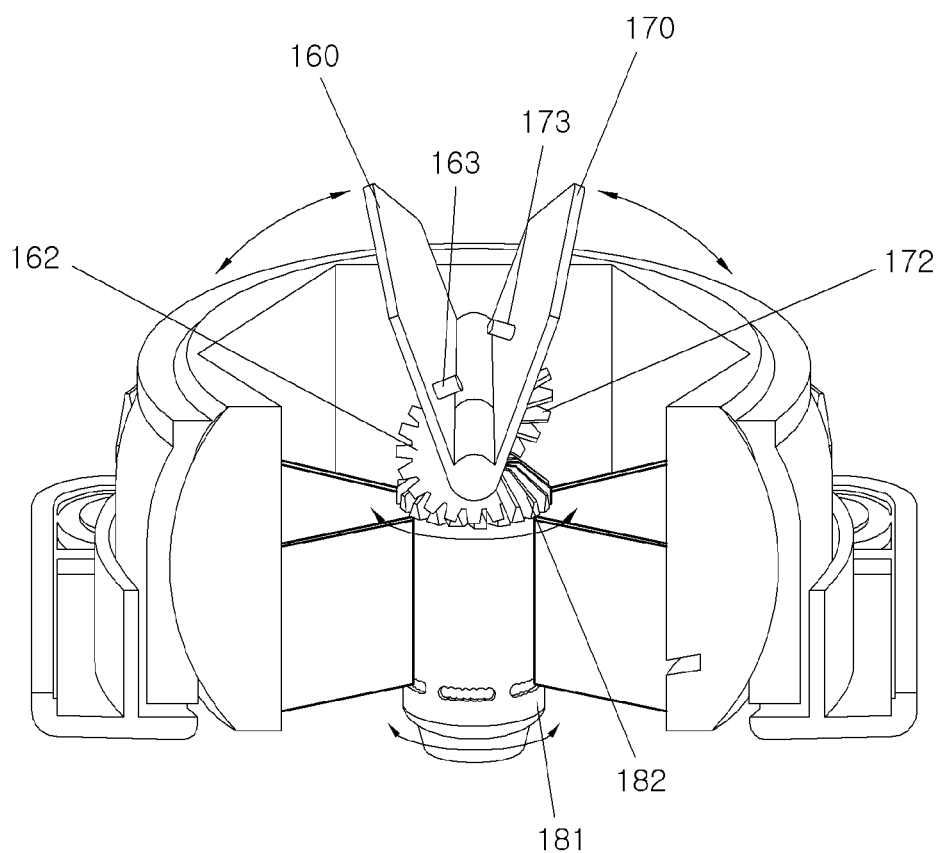
FIGS. 8 and 9 are diagrams showing a three-dimensional shape of a cross section taken along a D-D leader line of FIG. 1 according to an exemplary embodiment of the present disclosure.
Figure 9:
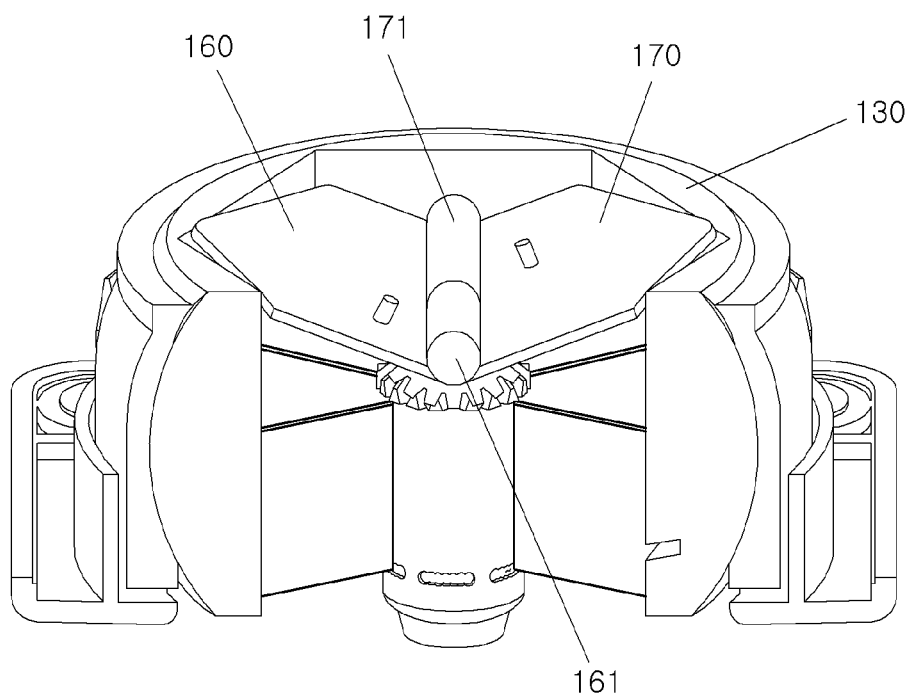

Moreover, the configurations of the discharge amount adjusting wing, the second knob, and the like will be described with reference to FIGS. 8 and 9 showing the three-dimensional shape of the cross section along the D-D leader line of FIG. 1. The discharge amount adjusting wings 160 and 170 may include two wings and may have a plate shape capable of closing the entire open surface of the ball 130. In other words, when the open surface is circular, the discharge amount adjusting wings 160 and 170 may be semicircular, and when the open surface is a hexagonal shape as shown in the figure, the discharge amount adjusting wings 160 and 170 have a rim shape capable of bisecting it.

The two discharge amount adjusting wings 160 and 170 may be configured to rotate together while sharing the second rotary shaft. Accordingly, one end of a first discharge amount adjusting wing 160 may include a male coupling portion 161 and one end of a second discharge amount adjusting wing 170 may include a female coupling portion 171. Thus, the male coupling portion 161 and the female coupling portion 171 may be coupled to each other.

The second wing gears 162 and 172 may be disposed at substantially the center of the male coupling portion 161 and the female coupling portion 171, such that the second wing gears 162 and 172 are geared with the second bevel gear 182 of the second knob 180. When the body 181 of the second knob 180 rotates, the discharge amount adjusting wings 160 and 170 rotate in opposite directions to each other by the rotation of the second bevel gear 182 to open or close the open surface.

Additionally, rear surfaces of the discharge adjusting wings 160 and 170 may include rear stoppers 163 and 173 as shown, to prevent the two discharge amount adjusting wings 160 and 170 from completely overlapping when being opened. One end of the male coupling portion 161 may be coupled to a pin 164 and thus the male coupling portion 161 may rotate about the pin 164 inserted into one side of the ball 130. One end of the female coupling portion 171 may also be connected to a pin 174 and thus the female coupling portion 171 may rotate about the pin 174 inserted into one side of the ball 130.

Figure 10:
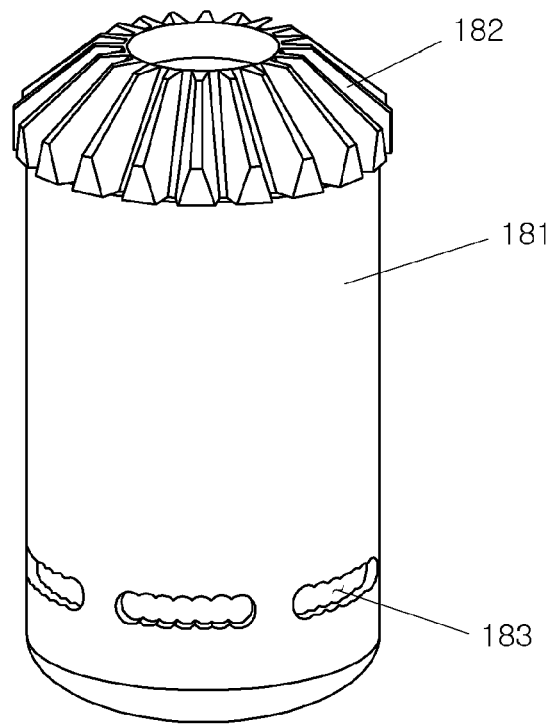
FIG. 10 is a diagram showing one configuration of the variable air vent according to the exemplary embodiment of the present disclosure.

A pin spring 175 may be coupled between the inside of the female coupling portion 171 and the pin 174, and thus may be configured to apply an elastic restoring force when operated in an opening direction after being closed. The pin spring may also be formed in the male coupling portion. Further, since the first rotary shaft 141 of the discharge range adjusting wing 140 is coupled to the second knob 180 to penetrate through the second knob 180, a side surface of the body 181 may include a shaft insertion groove 183 as shown in FIG. 10 to rotate the second knob 180. The end of the discharge amount adjusting wing 140 may be less than a radius of rotation of the ball 130 to prevent the discharge amount adjusting wing 140 from colliding with the ball housing 120 when the ball 130 rotates.

As described above, the variable air vent of the present disclosure may adjust the discharge amount and the discharge range of the air by using two knobs and two types of wings having different functions, thereby further satisfying the user's needs.

Figure 11:
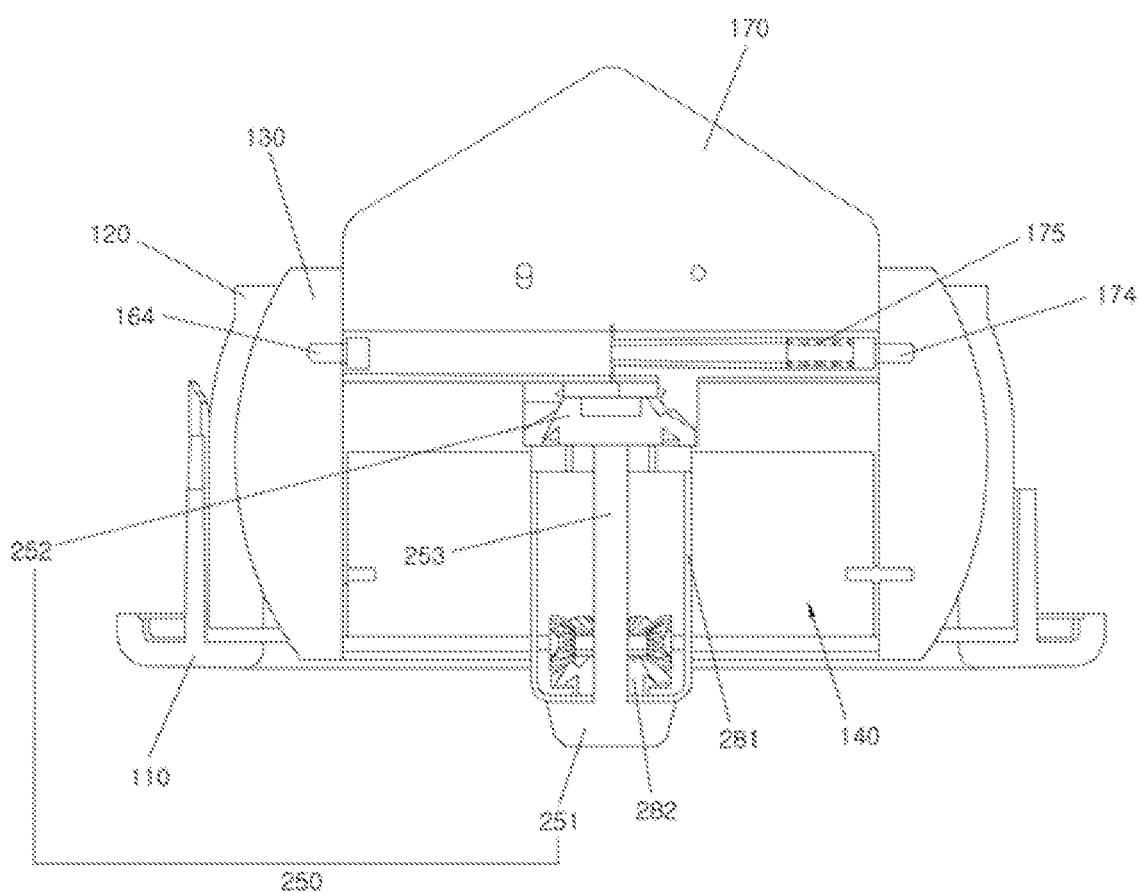
FIG. 11 is a front view of a variable air vent according to another exemplary embodiment of the present disclosure.

Furthermore, the present disclosure may be configured as a variable air vent according to another exemplary embodiment as shown in FIG. 11. The variable air vent according to another exemplary embodiment shown in FIG. 11 differs in the specific configurations of the first knob and the second knob, and the description of the same components as those of the above-described embodiment will be omitted.

The variable air vent of FIG. 11 according to another exemplary embodiment may include the discharge amount adjusting knobs 160 and 170 operated by a first knob 250 and the discharge range adjusting wing 140 operated by a second knob 280. In other words, the first knob 250 may include a head 251, a third bevel gear 252, and a rod 253, in which a first end of the rod 253 having a predetermined length may be connected to the head 251 and a second end of the rod 253 may be connected to the third bevel gear 252, and the third bevel gear 252 may be geared with second wing gears 162 and 172 of the discharge amount adjusting wings 160 and 170. The rod 253 may penetrate through the second knob 280. A second bevel gear 281 may be formed inwardly at one end of the first knob 250 side of the cylindrical body 281, such that the second knob 280 is geared with the first wing gear 143 of the discharge range adjusting wing 140. Notably, reference numeral 282 in the figures indicates a fourth bevel gear.

According to the variable air vent of the present disclosure, it may be possible to variably discharge air discharged into the vehicle interior by the operation of the air conditioner or the heater in the concentration mode or the dispersion mode, and thus, the air conditioner or the heater may be used according to the driver's preference.

Although the exemplary embodiments of the present disclosure have been disclosed with reference to exemplified drawings, those skilled in the art will appreciate that various modifications, additions and substitutions are possible, without departing from the scope and spirit of the disclosure as disclosed in the accompanying claims. It is therefore intended that such modifications or variations are within the scope of the appended claims and that the scope of the present disclosure should be construed on the basis of the appended claims.

What is claimed is:

1. A variable air vent, comprising: a housing mounted on a vehicle and having an open center; a ball housing coupled to the housing and having an inner side surface formed in a curved surface; a ball having front and rear surfaces opened and a side surface inserted into the ball housing in a curved surface form corresponding to the ball housing; a first knob and a second knob vertically disposed on the front and rear surfaces of the ball; and a plurality of discharge range adjusting wings having a first rotating shaft integrally formed at one end of a flat plate, wherein a first side of the first rotating shaft is rotatably inserted into the ball and a second side of the first rotating shaft includes a first wing gear inserted into the second knob, and wherein the first knob includes a first bevel gear inserted into the second knob, and the first bevel gear is geared with the first wing gear of the plurality of discharge range adjusting wings, wherein the second knob is rotatably coupled to the first knob through a first knob insertion groove formed in front of a cylindrical body and a rear of the body includes a second bevel gear, wherein the first bevel gear of the second knob is arranged at a forward-facing side of the cylindrical body, a pair of discharge amount adjusting wings provided to cover the open rear surface of the ball, wherein one end of each of the pair of discharge amount adjusting wings includes a second wing gear and the second wing gear is geared with the second bevel gear.

2. The variable air vent of claim 1, wherein when the first knob rotates about the open front and rear direction of the ball, an angle formed by the flat plate and the open front surface of the ball varies as the discharge range adjusting wing rotates.

3. The variable air vent of claim 2, wherein a rotation guide protrudes on one side of the discharge range adjusting wing, and the rotation guide is inserted into a guide groove formed in the ball.

4. The variable air vent of claim 3, wherein the guide groove has a circular arc shape in cross section.

5. The variable air vent of claim 1, wherein one end of a first discharge amount adjusting wing includes a male coupling portion and one end of a second discharge amount adjusting wing includes a female coupling portion to couple the male coupling portion and the female coupling portion to each other to share one rotary shaft, and the second wing gear is formed in each of the male coupling portion and the female coupling portion.

6. The variable air vent of claim 1, wherein a plurality of shaft insertion grooves are formed along a circumferential direction of the body of the second knob, and the first rotating shaft of each of the discharge range adjusting wings penetrates through each of the corresponding shaft insertion grooves.

* * * * *